United States Patent
Childers et al.

(10) Patent No.: US 8,240,153 B2
(45) Date of Patent: Aug. 14, 2012

(54) METHOD AND SYSTEM FOR CONTROLLING A SET POINT FOR EXTRACTING AIR FROM A COMPRESSOR TO PROVIDE TURBINE COOLING AIR IN A GAS TURBINE

(75) Inventors: Priscilla Childers, Greenville, SC (US); Mark Disch, Simpsonville, SC (US); Curtis Newton, III, Powder Springs, GA (US); David Wesley Ball, Jr., Easley, SC (US); Kenneth Neil Whaling, Simpsonville, SC (US); Alan Meier Truesdale, Taylors, SC (US)

(73) Assignee: General Electric Company, Schenectady, NY (US)

( * ) Notice: Subject to any disclaimer, the term of this patent is extended or adjusted under 35 U.S.C. 154(b) by 1327 days.

(21) Appl. No.: 12/120,621

(22) Filed: May 14, 2008

(65) Prior Publication Data
US 2012/0117977 A1 May 17, 2012

(51) Int. Cl.
*F02C 7/18* (2006.01)
*F02C 9/18* (2006.01)

(52) U.S. Cl. .............. 60/782; 60/785; 60/795; 60/806

(58) Field of Classification Search .......... 60/782, 60/784, 785, 806, 794, 795
See application file for complete search history.

(56) References Cited

U.S. PATENT DOCUMENTS

| | | | |
|---|---|---|---|
| 6,527,862 B2 | 3/2003 | McLoughlin et al. | |
| 6,550,253 B2 * | 4/2003 | Mortzheim et al. | 60/782 |
| 7,036,319 B2 * | 5/2006 | Saunders et al. | 60/782 |
| 7,328,098 B1 * | 2/2008 | VanderLeest et al. | 60/785 |
| 7,536,865 B2 * | 5/2009 | Mikhail | 60/795 |
| 2004/0221584 A1 * | 11/2004 | Hoffmann et al. | 60/782 |
| 2007/0125092 A1 | 6/2007 | Wolfe et al. | |
| 2007/0137213 A1 * | 6/2007 | Rickert et al. | 60/782 |
| 2007/0256420 A1 | 11/2007 | Schott et al. | |

* cited by examiner

*Primary Examiner* — Ted Kim
(74) *Attorney, Agent, or Firm* — Nixon & Vanderhye P.C.

(57) ABSTRACT

A method for controlling the generation of turbine cooling air from air extracted from a compressor of a gas turbine including: extracting compressed air from a low pressure and a high pressure stage of the compressor; adding in an ejector the compressed air from the low pressure stage to the air from the high pressure stage and discharging the combined air as turbine cooling air; bypassing the ejector with a bypass portion of the extracted compressed air from the high pressure stage; in response to turning on the flow of extracted compressed air from the low pressure stage, changing a set point for an actual pressure ratio that includes a pressure of the turbine cooling air, and adjusting the bypass flow in response to the changed set point to cause the actual pressure ratio to approach the changed set point.

21 Claims, 3 Drawing Sheets

METHOD AND SYSTEM FOR CONTROLLING A SET POINT FOR EXTRACTING AIR FROM A COMPRESSOR TO PROVIDE TURBINE COOLING AIR IN A GAS TURBINE

BACKGROUND OF THE INVENTION

The invention relates generally to extracting compressor air to provide cooling air for a turbine in a gas turbine and, more particularly to establishing control set points for the extraction of compressor air.

In industrial gas turbine engines, air is extracted from one or more stages of the compressor and applied to cool the turbine. The extraction of compressor air is commonly referred to as bleeding air from the compressor. The extracted compressor air is applied as cooling air that passes through internal cooling passages to the turbine blades and buckets.

The air extracted from the compressor for turbine cooling reduces the amount of air flowing through the compressor and to the combustion section of the gas turbine. This reduction in compressed air to the combustor may, at times, have undesirable effects on the performance of the combustor and the total performance of the gas turbine. Control systems are employed to regulate the extraction of compressor air to minimize these undesirable effects on the performance of the gas turbine and ensure that adequate cooling air reaches the turbine blades and buckets.

An approach to regulating the extraction of compressor air is to extract air from two or more stages of the compressor. Air extracted from the lower pressure stage of a compressor tends to have a lesser effect on the performance of the gas turbine than does air extracted from a higher pressure stage. By adjusting the relative proportions of air extracted from the two compressor stages, the control system can reduce or increase the effect of extraction of compressor air on the performance of the gas turbine and provide sufficient cooling air for the turbine.

Air ejectors are conventionally used to combine air at different pressures, such as air extracted from different stages of a compressor. An ejector has been used to combine air from different stages of a compressor to provide turbine cooling air. For example, compressor air has been extracted from a thirteenth stage of the compressor to cool a second stage nozzle of the turbine. Compressor air has also been extracted from a ninth stage of the compressor, where the air extracted from the ninth stage is at a lower pressure and temperature than is the air extracted from the thirteenth compressor stage. The extracted air from the thirteenth stage of the compressor, for example, may be at a pressure and temperature too great for the desired turbine cooling air. By employing an ejector, the low pressure and temperature air extracted from the ninth stage of a compressor is mixed with the high pressure and temperature air extracted from the thirteenth stage to provide an airflow at an intermediate pressure and temperature substantially matching the pressure and temperature required to cool the turbine stage.

An ejector generally does not have moving parts and, thus, does not provide for adjustments with respect to the mixing of air flows. During the design of the gas turbine, the ejector may be sized to provide a turbine cooling air at a desired pressure and temperature. However, the sizing of the ejector may assume that the gas turbine is operating at standard ambient conditions. Daily ambient temperature and pressure variations will impact the operational characteristics of the ejector. The temperature and pressure of air discharged from the ejector will vary as ambient conditions vary. On hot days, the ejector may deliver more cooling air than is required by the turbine. The performance of the compressor unnecessarily suffers because more air is extracted from the compressor than is needed to cool the turbine and, thus, the work required to compress the excess extracted air is wasted. On cold days, the ejector may not deliver enough air to cool the turbine. To account for such cold days, a bypass line has been used to allow some of the extracted air from the thirteenth compressor stage to bypass the ejector and flow directly to the turbine.

A regulatory valve has been provided to adjust the flow of bypass air depending on ambient conditions. A control system determines when to add air extracted from the ninth compressor stage to air extracted from the thirteenth compressor stage in the ejector and to determine a setting of a regulatory valve in the bypass conduit that extends around the ejector. The control system determines the desired amount of turbine cooling air based on a ratio of the pressure of the cooling air supplied to the second stage of the turbine and the compressor discharge air. This ratio is preferably maintained at a constant set point. To maintain this ratio at the set point, the control system may turn on or off a valve that provides ninth stage compressor air to the ejector and may adjust the valve that regulates the amount of bypass air.

As the control system turns on and off the valve allowing ninth stage compressor air to enter the ejector, there is an immediate change in the pressure ratio of the turbine cooling air to the compressor discharge pressure. The change is due to the addition of ninth stage compressor air to the ejector and hence the turbine cooling air or the termination of such ninth stage compressor air to the ejector. The immediate change in the pressure ratio causes the controller to attempt to adjust the valves to maintain the desired pressure ratio. However, current control systems may not provide controls that adequately address the immediate change in cooling air to compressor discharge pressure ratio. There is a desire, therefore, for a control system that can accommodate rapid variations in a desired turbine cooling air and compressor discharge pressure ratio.

SUMMARY OF THE INVENTION

A method has been developed for controlling the generation of turbine cooling air from air extracted from a compressor of a gas turbine, the method comprising: extracting compressed air from a low pressure stage of the compressor and from a high pressure stage of the compressor; adding in an ejector the compressed air from the low pressure stage to the air from the high pressure stage and discharging from the ejector the turbine cooling air; bypassing the ejector with a bypass portion of the extracted compressed air from the high pressure stage, wherein the bypass portion enters the turbine cooling air discharged from the ejector; turning off or on the flow of the extracted compressed air from the low pressure stage to the ejector; in response to turning the flow of extracted compressed air from the low pressure stage, changing a set point for an actual pressure ratio that includes a pressure of the turbine cooling air; adjusting the bypass flow in response to the changed set point to cause the actual pressure ratio to approach the changed set point.

A method has been developed for controlling the position of a bypass valve in a system for providing turbine cooling air from air extracted from a compressor in a gas turbine, wherein the bypass valve regulates compressed air extracted from a high compressor stage bypassing an ejector which mixes extracted compressed air from the high compressor stage with extracted compressed air from a low compressor stage, and wherein the flow of bypass extracted compressed air and compressed air from the ejector are combined to form turbine cooling air, the method comprising: turning on the flow of the extracted compressed air from the low pressure stage to the ejector after blocking the flow of the extracted compressed air from the low pressure stage to the ejector; in response to turning on the flow of extracted compressed air from the low pressure stage, changing a set point for an actual pressure ratio that includes a pressure of the turbine cooling air; adjusting the bypass valve in response to the changed set point to allow for additional bypass airflow and thereby cause the actual pressure ratio to approach the changed set point.

A system has been developed for controlling the position of a turbine cooling air bypass valve in a gas turbine having a compressor and a turbine, the system comprising: a low pressure extraction port of compressed air from a low stage of the compressor; a high pressure extraction port of compressed air from a high stage of the compressor; an ejector receiving a portion of the extracted compressed air from both the low stage and high stage; a valve upstream of the ejector and controlling whether extracted compressed air from the low stage reaches the ejector; a bypass valve in a bypass conduit circumventing the ejector and regulating a second portion of the extracted compressed air from the high stage compressor that bypasses the ejector and is combined with turbine cooling air discharged by the ejector, and a controller which responds to a command to open the valve upstream of the ejector, changes a set point for an actual pressure ratio that includes a pressure of the turbine cooling air and the change in the setpoint causes the controller to adjust the bypass valve to allow for additional bypass airflow and thereby cause the actual pressure ratio to approach the changed set point.

DETAILED DESCRIPTION OF THE EMBODIMENT DISCLOSED IN THE DRAWINGS

Figure 1:
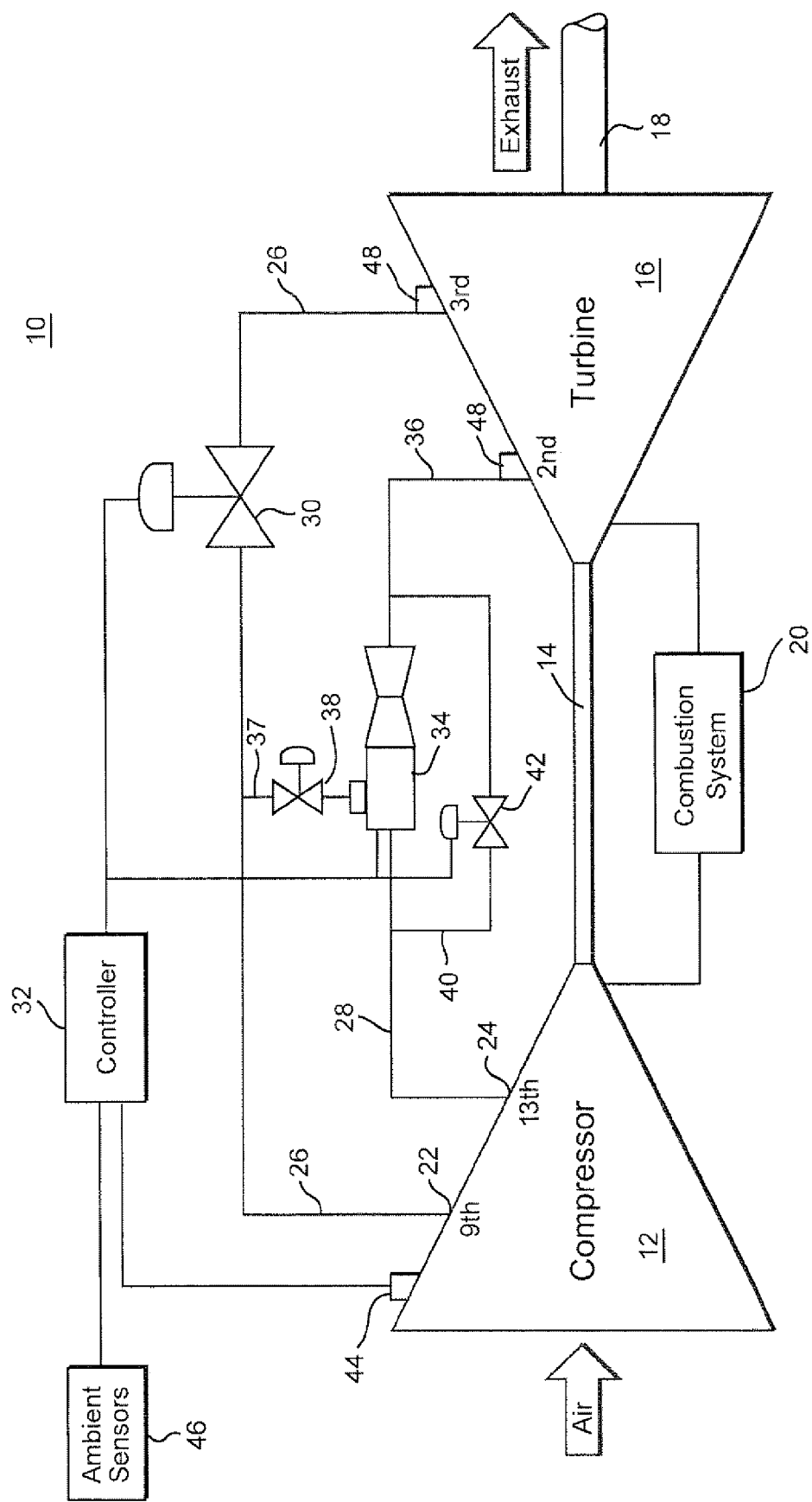
FIG. 1 is a schematic diagram of a gas turbine showing air being bled or extracted from the compressor and directed to the turbine.

FIG. 1 is a schematic diagram of a gas turbine 10, such as an industrial gas turbine, having a multi-stage axial compressor 12 driven, through a drive shaft(s) 14 by a multi-stage axial turbine 16. Power generated by the turbine may be delivered by a power shaft 18 to a power generator (not shown). Air enters an inlet to the axial stage compressor and is progressively pressurized by successive stages of the compressor. High pressure air from the last stage of the compressor is ducted to a combustion system 20 where the air is mixed with fuel and combusts. High pressure combustion gases pass through the stages of the turbine, which generally comprise alternating rows of buckets and vanes. The hot combustion gases drive the turbine by rotating the annular arrays of buckets in the turbine. The gas pressure in the turbine progressively reduces as the gases pass through the stages of the turbine.

Cooling air cools the buckets and vanes of the turbine. The cooling air is typically provided by extracting air from different stages in the compressor. For example, pressurized air may be extracted from an outlet 22 at the ninth stage of the compressor and from an outlet 24 at the thirteenth stage of the compressor. Air conduits 26, 28, e.g., pipes, direct the pressurized air from the compressor to the turbine. Air conduit 26 directs the pressurized air from port 22 at the ninth compressor stage to an inlet for the cooling air to the third stage of the turbine. The pressure of the air extracted from the ninth compressor stage is at a pressure level appropriate for the cooling air for the turbine buckets and blades of the third turbine stage. A valve 30 regulates the amount of compressor air in conduit 26 and may adjust the air from fully open to fully closed and intermediate positions between the open and closed positions. The valve 30 adjusts the amount and pressure of the compressed air being supplied to cool the third turbine stage. A computer controller 32 may adjust the valve 30 based on the operating conditions of the gas turbine and an overall control algorithm of the gas turbine.

Pressurized air extracted at port 24 from the thirteenth compressor stage is at a higher pressure than the air extracted from the ninth compressor stage. The air from the thirteenth compressor stage is directed via conduit 28, through an ejector 34 and to a conduit 36 that leads the cooling air to the second stage of the turbine. A portion of the pressurized air from the ninth compressor stage may be ducted through a conduit 37 and isolation valve 38 to the ejector 34 where the portion of air is added to the pressurized air flowing to the second turbine stage.

The isolation valve 38 is an ON-OFF valve that is either fully open or fully closed and has no intermediate position. The isolation valve prevents reverse flow of compressed air from the extractor to the conduit 26 leading to the third stage of the turbine. To prevent this reverse flow, the controller 32 shuts off the isolation valve 38 during certain ambient conditions.

The ejector 34 allows air at a lower pressure, e.g., air extracted from the ninth compressor stage, to be added to air at a higher pressure, such as the pressurized air extracted from the thirteenth stage of the compressor. Fixed area ejectors are known and one of which is disclosed in U.S. Patent Application Publication 2007/0125092. The ejector 34 discharges air at an intermediate pressure and temperature between the pressures and temperatures of the air extracted from the thirteenth and ninth stage of the compressors. The pressure and temperature of the air discharged from the ejector is at a pressure suitable for cooling air to the second turbine stage. The controller 32 adjusts the valve 38 to either allow ninth stage compressor air to enter the ejector or to prevent such air entering the ejector. The controller may determine the setting of the on-off valve 38 depending on, for example, ambient conditions surrounding the gas turbine. On a cold day, for example, the controller may open valve 38 to allow ninth stage compressor air to enter the ejector and thereby increase the cooling air flow from the ejector to the second stage turbine.

A bypass conduit 40 directs a portion of the thirteenth compressor stage around the ejector 34 and directly to the conduit 36 providing cooling air to the second stage of the turbine. A valve 42 regulates the air flow through the by-pass conduit and may be adjusted by the controller 32 from fully open to fully closed and at intermediate valve positions.

The ejector 34 is configured for a specified ambient condition, such as a particular ambient pressure and temperature. The ejector provides a proper amount of turbine cooling air for the specified ambient condition. To account for variations in ambient conditions, the by-pass valve 40 and associated by-pass conduit 42, provides additional turbine cooling air when needed such as when the ambient conditions are significantly different from the specified ambient condition. For example, the by-pass valve may adjust to a more open position to provide additional turbine cooling air for cold day ambient conditions.

The controller 32 adjusts valves 42 to regulate the amount of air extracted from the compressor and the cooling air provided to the turbine. The controller executes algorithms that determine the appropriate settings of the valves 30 and 42 based on operating conditions of the gas turbine. For example, the controller may adjust valve 42, which regulates the air in the bypass conduit 40, to maintain a predetermined ratio of the pressure of the cooling air entering the second stage of the turbine and the pressure of the air being discharged by the compressor.

The controller 32 receives data from sensors that track the pressure and temperature of various stages in the gas turbine, the position of valves 30, 38 and 40 and other conditions of the gas turbine, such as power output. Pressure and temperature sensors 44 monitor the pressure and temperature at various positions within the compressor. Pressure and temperature sensors 46 monitor the actual ambient pressure and temperature. Pressure and temperature sensors 48 may monitor the pressure and temperature of the turbine cooling air provided to the second and third stages of the turbine. The pressure sensors in the compressor and turbine provide data used by the controller to determine the absolute pressures at the turbine second stage and compressor discharge.

The controller 32 determines the appropriate position of the bypass valve 42. The bypass valve 42 may be controlled based on the ratio (S2N/CPD absolute) of the absolute pressure of the cooling air supplied to the second stage nozzle of the turbine (S2N) to absolute pressure of the air flowing at the compressor discharge (CPD). The S2N/CPD pressure ratio set point may be a variable dependent on the compressor discharge air pressure level, and may have a fixed set point value at gas turbine loads above a certain load level. The controller 32 may determine the appropriate S2N/CPD set point based on the actual compressor discharge pressure and an algorithm stored in the controller for determining the set point for the desired S2N/CPD pressure ratio. By comparing the actual pressure ratio (S2N/CPD absolute) to the S2N/CPD pressure ratio set point, the controller determines a setting for the bypass valve 42 to cause the actual pressure ratio (S2N/CPD absolute) to match the desired set point.

Figure 2:
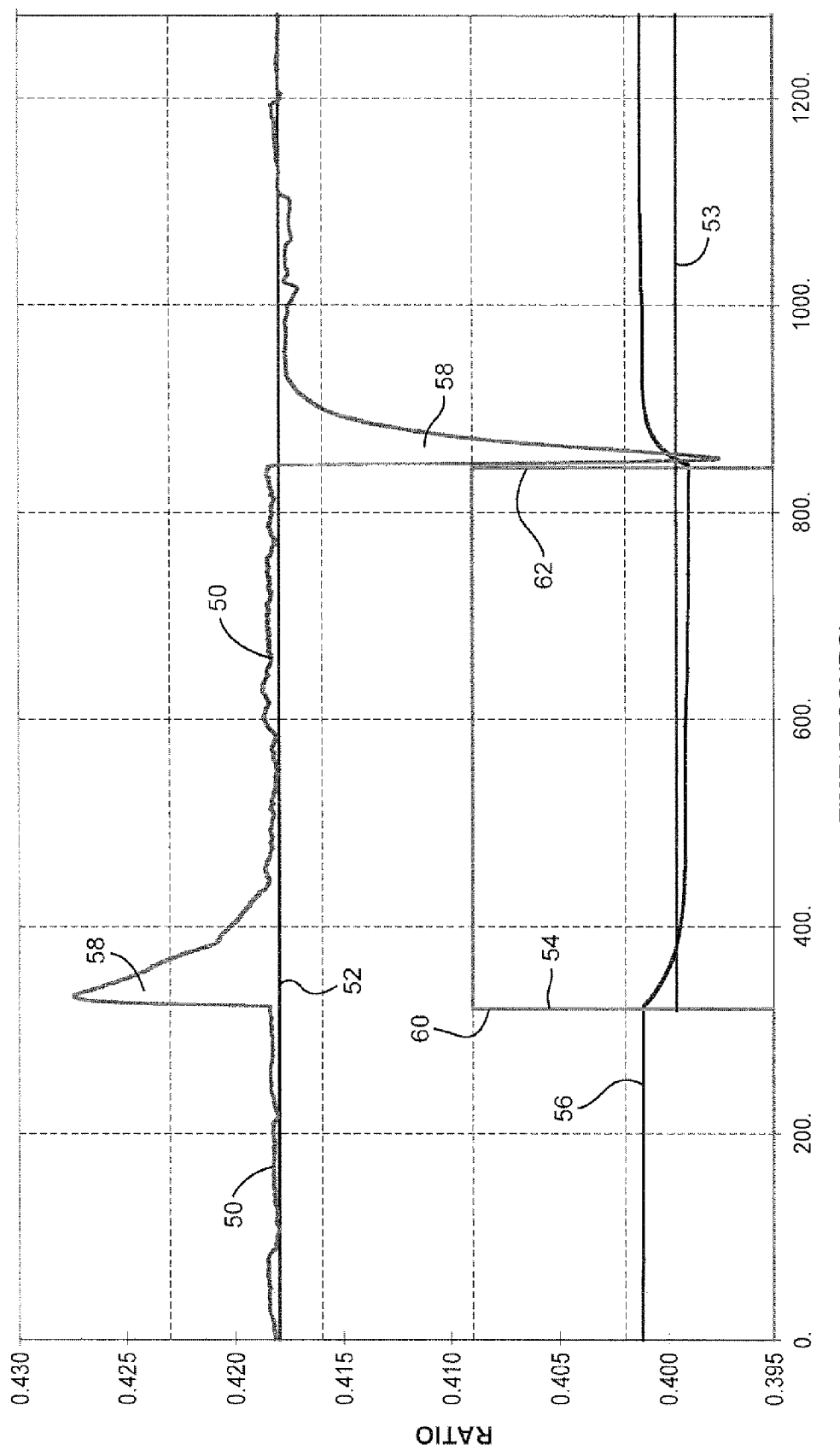
FIG. 2 is a time line chart showing certain operating conditions for a gas turbine, wherein the compressor extraction set point is not adjusted.

FIG. 2 is a chart showing conventional (prior art) control actions to maintain the S2N/CPD actual pressure ratio 50 at a desired S2N/CPD pressure ratio set point 52. The chart shows the values of the S2N/CPD pressure ratio 50 as a function of time in seconds. The chart also shows the desired S2N/CPD pressure ratio 52 as a constant value. In addition, the chart shows a minimum level 53 of the S2N/CPD pressure ratio which represents a condition that the S2N/CPD ratio should not reach in normal operation and, if reached, will cause the controller to take corrective actions, including possibly shutting down the gas turbine. In this example, the minimum level 53 is at a ratio value of 0.398. In addition, the chart shows the position 54 (ON/OFF) of the isolation valve (38 in FIG. 1) and the position 56 of the by-pass valve (42 in FIG. 1).

Switching the isolation valve 38 changes the amount of turbine cooling air flowing to the turbine and, thus, causes a step-change in the S2N/CPD actual pressure ratio. Spikes 58 in the S2N/CPD actual pressure ratio occur when the isolation valve 38 is opened 60 and closed 62. When the isolation valve is opened 60, the S2N/CPD actual pressure ratio spikes 58 above the desired set point 52 for the S2N/CPD. Generally, there is no deleterious effect to the upward spike. However, the controller may adjust the position of the bypass valve 42 in response to the upward spike to cause the S2N/CPD actual pressure ratio to return to the desired S2N/CPD pressure ratio set point 52. When the isolation valve is closed 62, a downward spike occurs in the S2N/CPD actual pressure ratio.

As the S2N/CPD pressure ratio spikes, the controller adjusts the by-pass valve to cause S2N/CPD actual pressure ratio to return to the desired S2N/CPD pressure ratio set point. Because the isolation valve switches nearly immediately between full ON to full OFF, the resulting spike in S2N/CPD pressure ratio occurs quickly and is large. The downward spike may cause the actual S2N/CPD pressure ratio to temporarily drop below the predetermined minimum S2N/CPD pressure ratio 53. The spike may continue such that the S2N/CPD actual pressure ratio remains below the minimum level 53 for several seconds.

The controller may determine a failure condition, e.g., cause the gas turbine to go off line or shut down, if the S2N/CPD pressure ratio remains below the minimum level 53 for more than a predetermined number of seconds. The controller may be unable to adjust the by-pass valve quickly enough to increase the S2N/CPD actual pressure ratio above the minimum pressure ratio 53 before the controller declares a failure condition. For example, a proportional-integral (PI) control algorithm used by the controller to adjust the by-pass valve may react too slowly to compensate for the downward spike change in the actual S2N/CPD pressure ratio. If the controller does not timely bring the actual S2N/CPD pressure ratio above the minimum pressure ratio 53 and into compliance with the desired set point for the S2N/CPD pressure ratio, the controller may determine that the turbine cooling air flow is inadequate and cause the turbine to be shutdown. Because there is a need to avoid, or at least minimize, shutdown conditions, there is a need to adequately compensate for spike changes in the S2N/CPD pressure ratio that can occur when the isolation valve is turned OFF or ON.

An approach to avoid a declaration of a failure condition is to add a time delay, e.g., 30 seconds to several minutes, after the isolation valves switches before a failure condition is declared. During the time delay, the S2N/CPD may fall below the minimum pressure ratio 53. The delay prevents the declaration of a failure condition unless the S2N/CPD remains below the minimum pressure ratio after expiration of the time delay. However, delaying the declaration of a failure condition does not avoid the occurrence of the S2N/CPD pressure ratio falling below the predetermined minimum pressure ratio. The downward spike in S2N/CPD will occur when the isolation valve is turned OFF and the predetermined minimum pressure ratio will be violated. The spike and violation of the minimum pressure ratio may adversely affect the life of the gas turbine. While in certain circumstances it may be sufficient to include the time delay to avoid declaration of a failure condition and a resulting gas turbine shutdown, it is preferable the spike in the S2N/CPD ratio be attenuated and the ratio not fall below the minimum pressure ratio.

Figure 3:
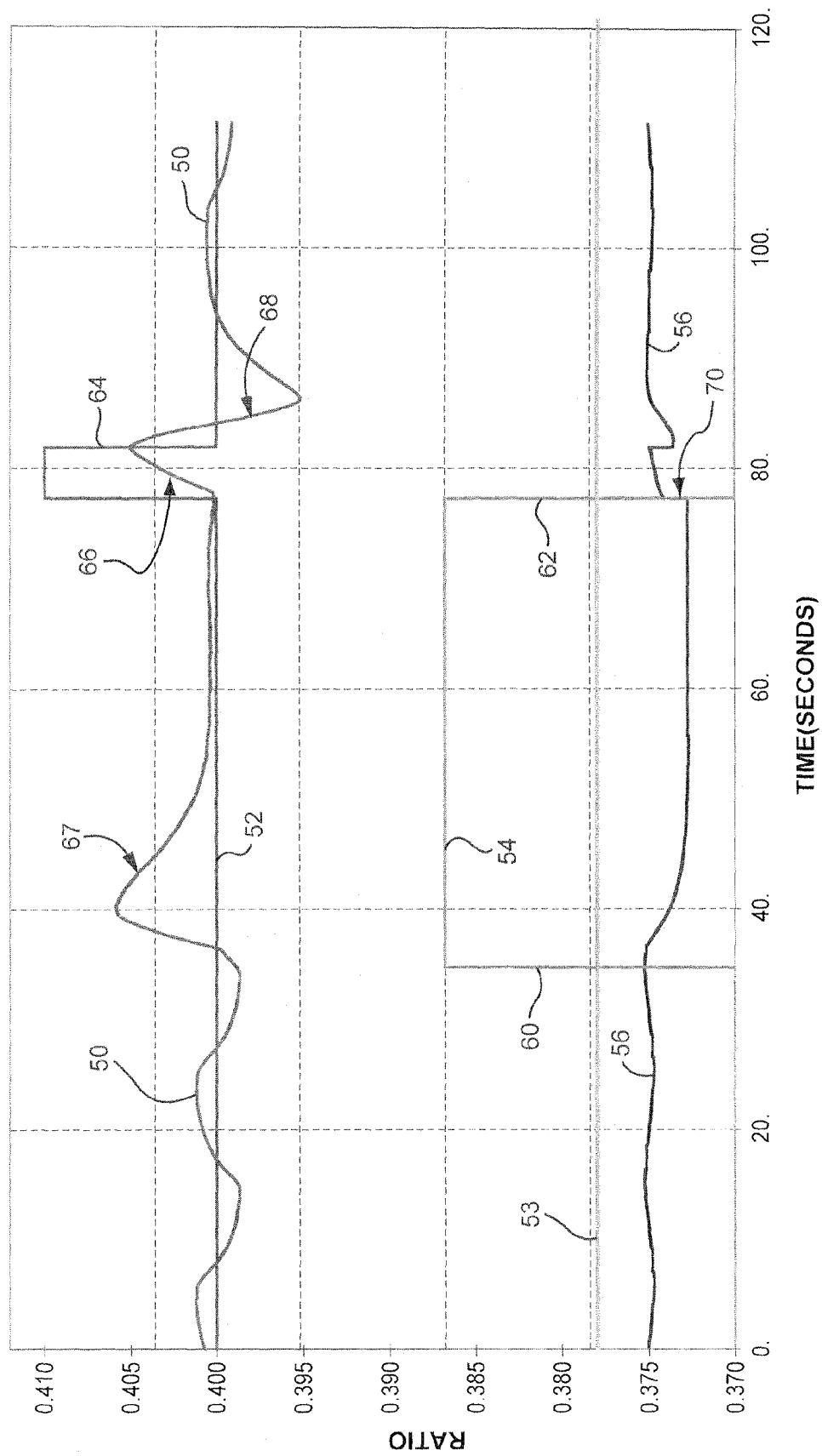
FIG. 3 is a time line chart showing certain operating conditions for a gas turbine, wherein the compressor extraction set point is adjusted.

FIG. 3 is a chart of the S2N/CPD actual pressure ratio 50, the S2N/CPD set point 52, and the position 56 of the by-pass valve and the position 54 of the isolation valve. The S2N/CPD set point 52 does not remain constant, as is shown in FIG. 2. Rather, the S2N/CPD pressure ratio set point 52 is adjusted in an upward step 64 when the controller determines that isolation valve is to be closed. The step 64 is temporary and may be a few seconds, such as five seconds. After the step 64 increase, the S2N/CPD pressure ratio set point returns to its prior value.

In response to the step 64 increase to the S2N/CPD pressure ratio set point, the controller rapidly and significantly adjusts the position 56 of the bypass valve to cause the S2N/CPD actual pressure ratio to adjust to the increase in the set point value. The position of the bypass valve may be adjusted in a quick step 70 that causes a rapid increase 66 in the S2N/CPD actual pressure ratio. The rapid adjustment to the bypass valve and the increase 66 in the S2N/CPD actual pressure ratio tends to reduce the drop 68 in the S2N/CPD actual pressure ratio that occurs in response to the closing 62 isolation valve. In particular, the S2N/CPD actual pressure ratio does not fall below the minimum level 53 because the S2N/CPD set point was increased in a step 64 and the bypass valve was adjusted in response to the step 64 in the set point.

By applying a step increase to the S2N/CPD pressure ratio set point, the S2N/CPD actual pressure ratio is prevented from falling below the predetermined minimum level or otherwise traversing the predetermined level. The potential is reduced for the controller declaring a failure state due to a change in the S2N/CPD pressure ratio when the isolation valve is closed. Further, the controller may apply a step decrease in the S2N/CPD pressure step point when the isolation valve is opened to reduce the severity of the upward spike 67 that would otherwise occur in the S2N/CPD actual pressure ratio.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for controlling the generation of turbine cooling air from air extracted from a compressor of a gas turbine, the method comprising:
    extracting compressed air from a low pressure stage of the compressor and from a high pressure stage of the compressor;
    adding in an ejector the extracted compressed air from the low pressure stage to the extracted air from the high pressure stage and discharging the compressed air from the ejector to the turbine cooling air;
    bypassing the ejector with a bypass portion of the extracted compressed air from the high pressure stage, wherein the bypass portion enters the turbine cooling air discharged from the ejector;
    adjusting the flow of the extracted compressed air from the low pressure stage to the ejector;
    in response to adjusting the flow of extracted compressed air from the low pressure stage, changing a set point for an actual pressure ratio that includes a pressure of the turbine cooling air;
    adjusting the bypass flow in response to the changed set point to cause the actual pressure ratio to approach the changed set point.

2. The method of claim 1 wherein the low pressure stage is a stage no higher than a tenth stage of the compressor and the high pressure stage is a stage no lower than an eleventh stage of the compressor.

3. The method of claim 1 wherein the pressure ratio is of the pressure of the turbine cooling air and a pressure of compressed air a discharge of the compressor to a combustor of the gas turbine.

4. The method of claim 1 wherein the changing of the set point is a step change in which the set point is immediately increased contemporaneously with the adjusting of the flow of extracted compressed air from the low pressure stage to the ejector, and the set point is subsequently reduced.

5. The method of claim 4 wherein the step change occurs for no more than ten seconds.

6. The method of claim 4 wherein the step change is sufficiently large to prevent the actual pressure ratio from traversing a predetermined pressure level.

7. The method of claim 1 wherein the set point is changed in response to adjusting the flow of the extracted compressed air from the low pressure stage to the ejector, and adjusting a bypass valve to make the adjustment to the bypass flow.

8. A method for controlling the position of a bypass valve in a system for providing turbine cooling air from air extracted from a compressor in a gas turbine, wherein the bypass valve regulates compressed air extracted from a high compressor stage bypassing an ejector which mixes extracted compressed air from the high compressor stage with extracted compressed air from a low compressor stage, and wherein the flow of bypass extracted compressed air and compressed air from the ejector are combined to form turbine cooling air, the method comprising:
    adjusting the flow of the extracted compressed air from the low pressure stage to the ejector after blocking the flow of the extracted compressed air from the low pressure stage to the ejector;
    in response to adjustment of the flow of extracted compressed air from the low pressure stage, changing a set point for an actual pressure ratio that includes a pressure of the turbine cooling air; and
    adjusting the bypass valve in response to the changed set point to allow for additional bypass airflow and thereby cause the actual pressure ratio to approach the changed set point.

9. The method of claim 8 wherein the low pressure stage is a stage no higher than a tenth stage of the compressor and the high pressure stage is a stage no lower than an eleventh stage of the compressor.

10. The method of claim 8 wherein the pressure ratio is a ratio of the pressure of the turbine cooling air and a pressure of compressed air at a discharge of the compressor to a combustor of the gas turbine.

11. The method of claim 8 wherein the changing of the set point is a step change in which the set point is immediately increased contemporaneously with the turning on of the flow of extracted compressed air from the low pressure stage to the ejector, and the set point is subsequently reduced.

12. The method of claim 11 wherein the step change occurs for no more than ten seconds.

13. The method of claim 11 wherein the step change is sufficiently large to prevent the actual pressure ratio from traversing a predetermined pressure level.

14. The method of claim 8 wherein the set point is changed in response to turning on of the flow of the extracted compressed air from the low pressure stage to the ejector, and adjusting a bypass valve to make the adjustment to the bypass flow.

15. A system for controlling the position of a turbine cooling air bypass valve in a gas turbine having a compressor and a turbine, the system comprising:
    a low pressure extraction port of compressed air from a low stage of the compressor;
    a high pressure extraction port of compressed air from a high stage of the compressor;
    an ejector receiving a portion of the extracted compressed air from both the low stage and high stage;
    a valve upstream of the ejector and controlling whether extracted compressed air from the low stage reaches the ejector;
    a bypass valve in a bypass conduit circumventing the ejector and regulating a second portion of the extracted compressed air from the high stage compressor that bypasses the ejector and is combined with turbine cooling air discharged by the ejector, and a controller which responds to a command to open the valve upstream of the ejector, changes a set point for an actual pressure ratio that includes a pressure of the turbine cooling air and the change in the setpoint causes the controller to adjust the bypass valve to allow for additional bypass airflow and thereby cause the actual pressure ratio to approach the changed set point.

16. The system of claim 15 wherein the low pressure stage is a stage no higher than a tenth stage of the compressor and the high pressure stage is a stage no lower than an eleventh stage of the compressor.

17. The system of claim 15 wherein the pressure ratio is of the pressure of the turbine cooling air and a pressure of compressed air at a discharge of the compressor to a combustor of the gas turbine.

18. The system of claim 15 wherein the changing of the set point is a step change in which the set point is immediately increased contemporaneously with the turning on of the flow of extracted compressed air from the low pressure stage to the ejector, and the set point is subsequently reduced.

19. The system of claim 18 wherein the step change occurs for no more than ten seconds.

20. The system of claim 18 wherein the step change is sufficiently large to prevent the actual pressure ratio from traversing a predetermined pressure level.

21. A method for controlling the generation of turbine cooling air from air extracted from a compressor of a gas turbine, the method comprising:

extracting compressed air from a low pressure stage of the compressor and from a high pressure stage of the compressor;

adding in an ejector the compressed air from the low pressure stage to the air from the high pressure stage and discharging from the ejector the turbine cooling air;

bypassing the ejector with a bypass portion of the extracted compressed air from the high pressure stage, wherein the bypass portion enters the turbine cooling air discharged from the ejector;

adjusting the flow of the extracted compressed air from the low pressure stage to the ejector after blocking the flow of the extracted compressed air from the low pressure stage to the ejector;

in response to adjusting the flow of extracted compressed air from the low pressure stage, changing a set point for an actual pressure ratio that includes a pressure of the turbine cooling air; and adjusting the bypass flow in response to the changed set point to cause the actual pressure ratio to approach the changed set point.

\* \* \* \* \*